March 14, 1933. M. KALBEN 1,901,168
SECTIONAL ROD COUPLING
Filed Dec. 16, 1930
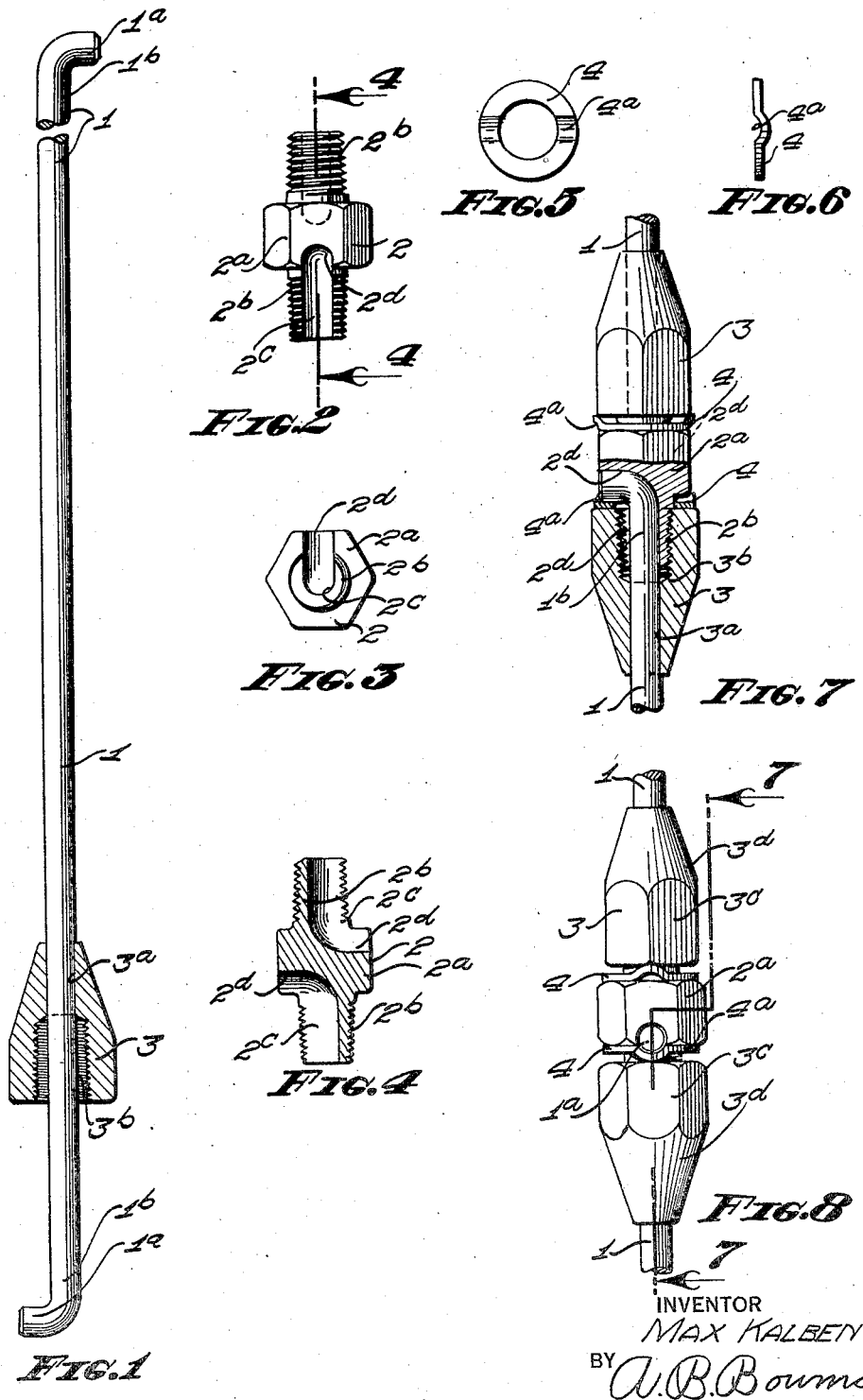
INVENTOR
MAX KALBEN
BY A. B. Bowman
ATTORNEY Patented Mar. 14, 1933

1,901,168

UNITED STATES PATENT OFFICE

MAX KALBEN, OF SAN DIEGO, CALIFORNIA

SECTIONAL ROD COUPLING

Application filed December 16, 1930. Serial No. 502,643.

My invention relates to couplings, more particularly to sectional rod couplings, and the objects of my invention are:

First, to provide a coupling of this class which is particularly adapted to join cleanout rods used in connection with the repairing of plumbing;

Second, to provide a coupling of this class which is capable of withstanding strains of any nature, such as tensional strains, compression strains, and tortional strains, without loosening;

Third, to provide a coupling of this class which, if need be, is capable of holding adjacent lengths of rod in accurate axial alinement;

Fourth, to provide a coupling of this class which, though capable of holding rods secure against accidental separation, may, when desired, be quickly separated;

Fifth, to provide a coupling of this class which may be connected or disconnected without the use of tools as the action of the rods with which the coupling is used cannot be applied in such a manner as to cause the coupling to work loose; and Sixth, to provide on the whole a novelly constructed rod coupling which is durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is an elevational view of a rod used in conjunction with my coupling, and one of the locking nuts positioned thereon and in section;

Fig. 2 is a side elevational view of the connecting member;

Fig. 3 is an end elevational view thereof;

Fig. 4 is a sectional view thereof, through 4—4 of Fig. 2;

Fig. 5 is an elevational view of one of the washers;

Fig. 6 is an edge elevational view thereof;

Fig. 7 is an assembled view of the coupling, with the rods shown fragmentarily and with parts and portions in section to facilitate the illustration, the section being taken along substantially 7—7 of Fig. 8; and Fig. 8 is an elevational view of the completed coupling, taken at right angles to Fig. 7, and showing the rods fragmentarily.

Similar characters of reference refer to similar parts and portions throughout the several views of the drawing.

Rods 1, connecting member 2, lock nuts 3, and washers 4 constitute the principal parts and portions of my novel sectional rod coupling.

The rod, designated 1, with which my coupling is adapted to be used, is of the proper size and strength, and may be either round or of polygonal cross section. At each end of the rod 1, there is formed a short, right angularly extending projection 1a, formed by bending the rod, as shown best in Fig. 1.

The connecting member 2 of my coupling is provided with an enlarged central portion 2a, which is polygonal, preferably six-sided. Extending from either end of the central portion 2a, are externally threaded nipples 2b. Each nipple 2b is intersected by a slot 2c, which is adapted to snugly receive a shank portion, designated 1b, of the rod 1, adjacent one of the projections 1a. The axis of the rod, when so received by the notch 2c, is in axial alinement with the connecting member 2, as shown best in Fig. 7. The channel 2c extends into the central portion 2a of the connecting member so as to intersect one of the flat sides thereof. The channel 2c thus forms a notch 2d at its inner end, which extends from the periphery of the nipple 2b to the periphery of the enlarged central portion 2a, as shown best in Figs. 2, 3, and 4. The notches 2d receive the extended portions of the projections 1a. It will be noted that the channels 2c and notches 2d of the connecting member face in opposite radial directions, as shown best in Fig. 4.

Slidably mounted upon the rod 1, is a pair of lock nuts. The bore of each lock nut forms a sleeve 3a for a portion of its length, which snugly receives the rod 1. The remaining portion of the bore is enlarged and screw-threaded, forming an internally threaded portion 3b, which is adapted to screw upon one of the nipples 2b.

Each lock nut is largest at its internally threaded end. This portion is polygonal, as indicated by 3c. From the polygonal portion 3c, the lock nut diminishes in cross section, forming a conical portion 3d, which prevents the coupling from catching when inserted in a pipe or the like.

A pair of washers 4 is provided; the washers are in the form of rings, with a pair of diametrically disposed, radially extending channels 4a, which complement the notches 2c, as shown best in Fig. 2.

My coupling member is assembled as follows: The ends of a pair of rods 1 are inserted in the channels 2c and notches 2d of the connecting member 2, first having slipped the washers 4 over the rod. These washers are fitted against the ends of the enlarged portion 2a, so that one channel 4a of each washer receives the portion of the projection 1a which protrudes from the corresponding notch 2d. The lock nuts 3 are then screwed onto the nipples 2b until they bear against the washers 4. When thus coupled, the rods 1 are rigidly locked against all relative movement.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a sectional sewer rod coupling, a connector member provided with a wrench engaging middle portion and reduced threaded portions at its opposite ends and provided with a groove in one side only at one end and a similar groove in its opposite side only at its other end, said grooves being separated from each other so that the inner ends of said grooves are offset in relation to each other.

2. In a sectional sewer rod coupling, a connector member provided with a wrench engaging middle portion and reduced threaded portions at its opposite ends and provided with a groove in one side only at one end and a similar groove in its opposite side only at its other end, said grooves being separated from each other so that the inner ends of said grooves are offset in relation to each other and rods with right angle turns adapted to fit in said grooves and their turned ends extending outwardly in opposite directions at the middle portion of said connector member.

3. In a sectional sewer rod coupling, a connector member provided with a wrench engaging middle portion and reduced threaded portions at its opposite ends and provided with a groove in one side only at one end and a similar groove in its opposite side only at its other end, said grooves being separated from each other so that the inner ends of said grooves are offset in relation to each other and rods with right angle turns adapted to fit in said grooves and their turned ends extending outwardly in opposite directions at the middle portion of said connector member and threaded locking means adapted to screw on said threaded ends mounted on said rods and adapted to rest against the turned portion of said rods for rigidly connecting said rods and connector member together.

4. In a sectional screw rod coupling, a connector member threaded at its opposite ends and enlarged at its middle portion provided with a groove in one side only of one threaded end and a similar groove in the opposite side only of the other threaded end, said grooves extending outwardly into the enlarged portion in opposite directions, rods with turned ends adapted to fit in said grooves so that the turned ends extend in opposite directions and locking means slidably mounted upon said rods and arranged to engage the turned ends of said rods and the enlarged portion of said connector member for rigidly connecting the ends of said rods and connector member together.

5. In a sectional screw rod coupling, a connector member threaded at its opposite ends and enlarged at its middle portion provided with a groove in one side only of one threaded end and a similar groove in the opposite side only of the other threaded end, said grooves extending outwardly into the enlarged portion in opposite directions, rods with turned ends adapted to fit in said grooves so that the turned ends extend in opposite directions and locking means slidably mounted upon said rods and arranged to engage the turned ends of said rods and the enlarged portion of said connector member for rigidly connecting the ends of said rods and connector member together, said locking means including washers provided with complementary channels arranged to fit between said connector member and said locking means and receive the turned ends of said rods.

In testimony whereof, I have hereunto set my hand at San Diego, California, this 4th day of December, 1930.

MAX KALBEN.